United States Patent
Barraud et al.

(10) Patent No.: US 10,078,858 B2
(45) Date of Patent: Sep. 18, 2018

(54) SYSTEMS, METHODS, AND COMPUTER PROGRAM PRODUCTS FOR IMPLEMENTING A FREE-TEXT SEARCH DATABASE

(71) Applicant: Amadeus S.A.S., Biot (FR)

(72) Inventors: Romain Barraud, Mouans-Sartoux (FR); David Pauchet, Pegomas (FR); Teodor-Vlad Tanasescu, Antibes (FR)

(73) Assignee: AMADEUS S.A.S., Biot (FR)

( * ) Notice: Subject to any disclaimer, the term of this patent is extended or adjusted under 35 U.S.C. 154(b) by 568 days.

(21) Appl. No.: 14/818,765

(22) Filed: Aug. 5, 2015

(65) Prior Publication Data
US 2017/0039619 A1    Feb. 9, 2017

(51) Int. Cl.
  *G06F 7/00* (2006.01)
  *G06F 17/30* (2006.01)
  *G06Q 30/06* (2012.01)
  *G06Q 50/14* (2012.01)

(52) U.S. Cl.
  CPC ..... *G06Q 30/0623* (2013.01); *G06F 17/3064* (2013.01); *G06F 17/30663* (2013.01); *G06F 17/30684* (2013.01); *G06F 17/30693* (2013.01); *G06F 17/30702* (2013.01); *G06F 17/30867* (2013.01); *G06Q 50/14* (2013.01)

(58) Field of Classification Search
  CPC .......... G06F 17/3064; G06F 17/30663; G06F 17/30684; G06F 17/30693; G06F 17/30702; G06F 17/30867; G06Q 30/0623; G06Q 50/14
  See application file for complete search history.

(56) References Cited

U.S. PATENT DOCUMENTS

| | | | |
|---|---|---|---|
| 8,001,152 B1 | 8/2011 | Solan | |
| 9,589,230 B1* | 3/2017 | Thiagarajan | G06N 5/04 |
| 2004/0128615 A1* | 7/2004 | Carmel | G06F 17/30911 715/205 |
| 2009/0157664 A1 | 6/2009 | Wen | |
| 2011/0153654 A1 | 6/2011 | Lee | |
| 2014/0052712 A1* | 2/2014 | Savage | G06F 17/30707 707/722 |

FOREIGN PATENT DOCUMENTS

WO    2004070628 A1    8/2004

OTHER PUBLICATIONS

European Patent Office, Search Report issued in European Application No. 15 29 0202 dated Feb. 16, 2016.

* cited by examiner

*Primary Examiner* — Azam Cheema
(74) *Attorney, Agent, or Firm* — Thompson Hine LLP

(57) ABSTRACT

Systems, methods, and computer program products for implementing a dynamic free-text search database. First data is generated for the dynamic free-text search database that represents a first relationship including a first keyword, a first trip, and a first weight value. A plurality of free-text search requests are received, and a second weight value for the first relationship is calculated based on the free-text search requests. The second weight value differs from the first weight value. The first data is transformed into second by inserting the second weight value into the first data such that the first relationship includes the second weight value.

29 Claims, 8 Drawing Sheets

SYSTEMS, METHODS, AND COMPUTER PROGRAM PRODUCTS FOR IMPLEMENTING A FREE-TEXT SEARCH DATABASE

TECHNICAL FIELD

The present invention generally relates to computer databases and, more particularly, to systems, methods, and computer program products for implementing a free-text search database that facilitates providing travel suggestions based on free-text searches.

BACKGROUND

A computer database enables large amounts of electronic information to be organized in a logical manner. Such logical organization enables the computer database to quickly and efficiently return such information, or at least a portion thereof, in response to a query received from a requesting system. The requesting system may then use the information returned from the database to facilitate a process executed by the system.

Service providers such as airlines are known to utilize such databases to assist users in planning a trip. In particular, when a trip is in the process of being planned, a user may have only developed a general idea of the trip and not the specifics. For example, a user may desire to travel to a destination with warm weather during the winter, but be unsure of a specific destination or dates. Consequently, systems have been developed to assist the user by providing travel suggestions based on the user's generalized trip preferences. Upon receiving the user's trip preferences, the systems search a database for travel suggestions that match the provided trip preferences.

The above systems commonly utilize a graphical user interface ("GUI") to receive the user's trip parameters. The GUI typically includes multiple fields, each being dedicated to a predetermined type of trip parameter. For example, one field may be dedicated to receiving a preferred budget, and another field may be dedicated to receiving a preferred date range. Each of the fields also includes a predefined format in which the associated trip parameter must be entered. In this way, the GUI limits the type and format of trip parameters that may be received from a user and searched in the database.

Improved systems, methods, and computer program products are needed for implementing a free-text search database that facilitates providing travel suggestions based on free-text searches.

SUMMARY

In one embodiment, a method for implementing a dynamic free-text search database includes generating, by at least one processor, first data for the dynamic free-text search database that represents a first relationship including a first keyword, a first trip, and a first weight value. In addition, the method includes receiving, by the at least one processor, a plurality of free-text search requests, and calculating, by the at least one processor, a second weight value for the first relationship based on the free-text search requests. The second weight value differs from the first weight value. The method further includes transforming, by the at least one processor, the first data into second data by inserting the second weight value into the first data such that the first relationship includes the second weight value.

In a further embodiment, a system for implementing a dynamic free-text search database includes at least one processor and a memory coupled to the at least one processor. The memory stores instructions that upon execution by the at least one processor cause the system to generate first data for the dynamic free-text search database that represents a first relationship including a first keyword, a first trip, and a first weight value, receive a plurality of free-text search requests, and calculate a second weight value for the first relationship based on the free-text search requests. The second weight value differs from the first weight value. The stored instructions upon execution further cause the system to transform the first data into second data by inserting the second weight value into the first data such that the first relationship includes the second weight value.

In another embodiment, a computer program product includes a non-transitory computer readable medium. Instructions are stored on the non-transitory computer readable medium. The instructions, upon execution by the at least one processor, cause the at least one processor to generate first data for the dynamic free-text search database that represents a first relationship including a first keyword, a first trip, and a first weight value, receive a plurality of free-text search requests, and calculate a second weight value for the first relationship based on the free-text search requests. The second weight value differs from the first weight value. The instructions upon execution further cause the at least one processor to transform the first data into second data by inserting the second weight value into the first data such that the first relationship includes the second weight value.

DETAILED DESCRIPTION

Figure 1:
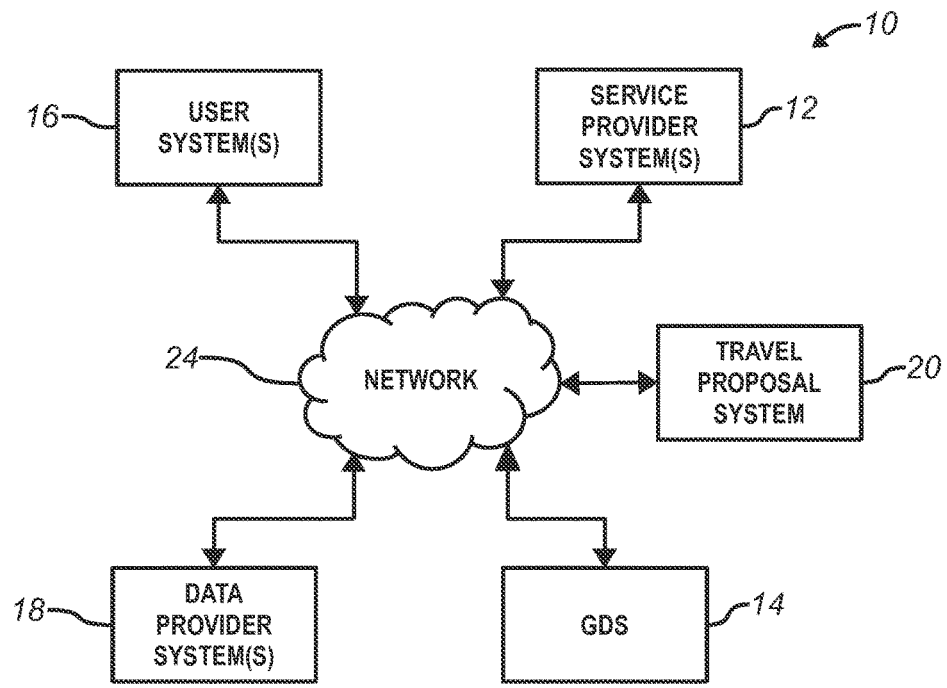
FIG. 1 is a schematic view of an exemplary operating environment that includes a travel proposal system.

FIG. 1 illustrates an exemplary operating environment 10. The exemplary operating environment 10 may include one or more service provider systems 12, a global distribution system ("GDS") 14, one or more user systems 16, one or more data provider systems 18, and/or a travel proposal system 20. Any of the service provider systems 12, the GDS 14, the user systems 16, the data provider systems 18, and the travel proposal system 20 may communicate through a direct connection or through a network 24 such as the Internet. Moreover, two or more of these systems may be integrated into one system. For example, one system may host the GDS 14, one or more of the service provider systems 12, and/or the travel proposal system 20.

Each of the service provider systems 12 may belong to any entity capable of receiving inventory search requests and reservation requests from a user system 16. Such an entity, for example, may be an airline, a hotel, a car rental service, or an activity provider such as a venue or promoter. A service provider system 12 may maintain an inventory database of the service provider's products. Upon receiving an inventory search request, the service provider system 12 may query the inventory database to determine available solutions matching the search request. In addition, each of the service provider systems 12 may maintain a database of reservation records for its products. In the case of an airline, for example, the service provider system 12 may store a passenger name record ("PNR") for each reserved flight itinerary. The PNR may include information about the reserved flight itinerary and information about each passenger under the reservation.

The GDS 14 may provide consolidated access to the inventory and reservation databases of multiple service provider systems 12, which enables centralized searches of the inventories of multiple service provider systems 12 and reservations involving multiple service providers. In particular, the GDS 14 may include a real-time connection to the inventory and reservation databases of each service provider system 12, or it may cache such data in a local database. In response to receiving an inventory search request from a user system 16, the GDS 14 may utilize the real-time connection or the cached data to determine available solutions from more than one service provider system 12. For example, the GDS 14 may provide available travel solutions from multiple airlines so that the user may compare and select a lowest-cost option. The GDS 14 may also provide a solution that involves a combination of two or more service providers, such as a travel solution having a multi-segment flight itinerary with each segment being operated by a different airline. Moreover, the GDS 14 may provide a solution that includes a combination of service types, such as a solution including both a flight and a hotel.

The travel proposal system 20 may be configured to assist a user in planning a trip. More particular, a user may have a general idea for a trip, but be unsure of the trip's specifics such as the exact dates or destination. The travel proposal system 20 may thus be configured to receive generalized trip search criteria, and provide travel suggestions or proposals based thereon. To this end, the travel proposal system 20 may also be configured to receive a free-text search request from a user, such as via the user system 16. Unlike typical travel search inquiries, which are limited to search criteria of a predefined type submitted in a specified format, a free-text search request may include a free-text search string that is a free-format natural language query entered by a user. For example, a user may enter "sunny place with a beach" as part of a free-text search request. Because the free-text search string is not limited to any particular format, language, and/or substance, the ability of the travel proposal system 20 to process such strings may enable a user to efficiently create a search request with any search criteria. The user does not need to worry about the format, language, or type of criteria entered into the free-text string, which ultimately results in an increasingly accessible system.

The travel proposal system 20 may maintain a dynamic free-text search database 56 (FIG. 3) to facilitate the provision of travel suggestions or proposals based on a received free-text search request. In particular, the travel proposal system 20 may be configured to retrieve data from the data provider systems 18, which may include online sources such as Wikipedia, websites featuring trip advertisements, and social platforms. The travel proposal system 20 may further be configured to determine data representative of relationships from the retrieved data, and store the data representative of the relationships in the dynamic free-text search database 56. Each relationship represented by the data may include one or more keywords, a weight, and a trip.

Upon receiving a free-text search request, such as via a user system 16, the travel proposal system 20 may utilize the determined relationships to generate one or more travel proposals matching the free-text search request. For example, the travel proposal system 20 may match a free-text search request that includes "sunny place with a beach" to a trip to Paris in August. The travel proposal system 20 may thereafter transmit this trip as a travel proposal to the user system 16 for action by the user. For example, the user may select Paris as a destination, select specific dates in August, and issue reservation requests to the GDS 14 and/or service provider systems 12 based on the provided travel proposal.

The travel proposal system 20 may further include a mechanism by which to dynamically update the relationships stored in the dynamic free-text search database 56. Such a mechanism ensures that the relationships are accurate and remain relevant, which increases the overall efficiency of the system in responding to free-text search requests. More particularly, by dynamically updating the relationships, the travel proposal system 20 reduces electronic storage of and avoids the searching of non-meaningful or outdated relationships. As an example, the travel proposal system 20 may utilize received free-text search requests, user actions, and online resources such as social media to update the stored relationships. The dynamic updating of the relationships stored in the dynamic free-text search database 56 is discussed in more detail below.

Figure 2:
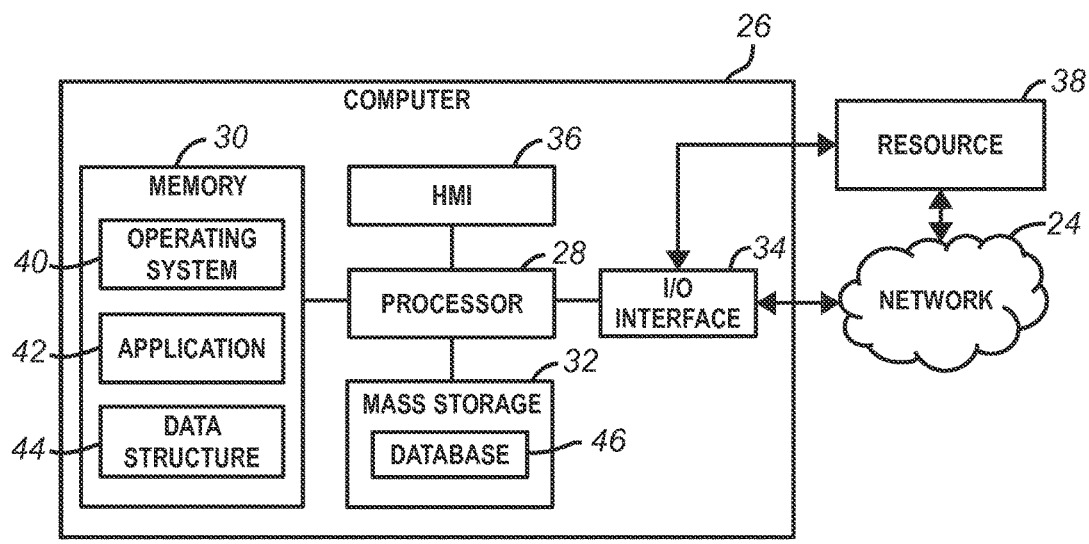
FIG. 2 is a schematic view of an exemplary computer system of the operating environment in FIG. 1.

Referring now to FIG. 2, the service provider systems 12, GDS 14, user systems 16, data provider systems 18, and/or travel proposal system 20 of operating environment 10 may be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or external resource 38. The application 42 may thereby work cooperatively with the network 24 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer 26 in a known manner to allow a user to interact directly with the computer 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, pushbuttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules. In one embodiment, the database 46 may comprise the dynamic free-text search database 56.

Figure 3:
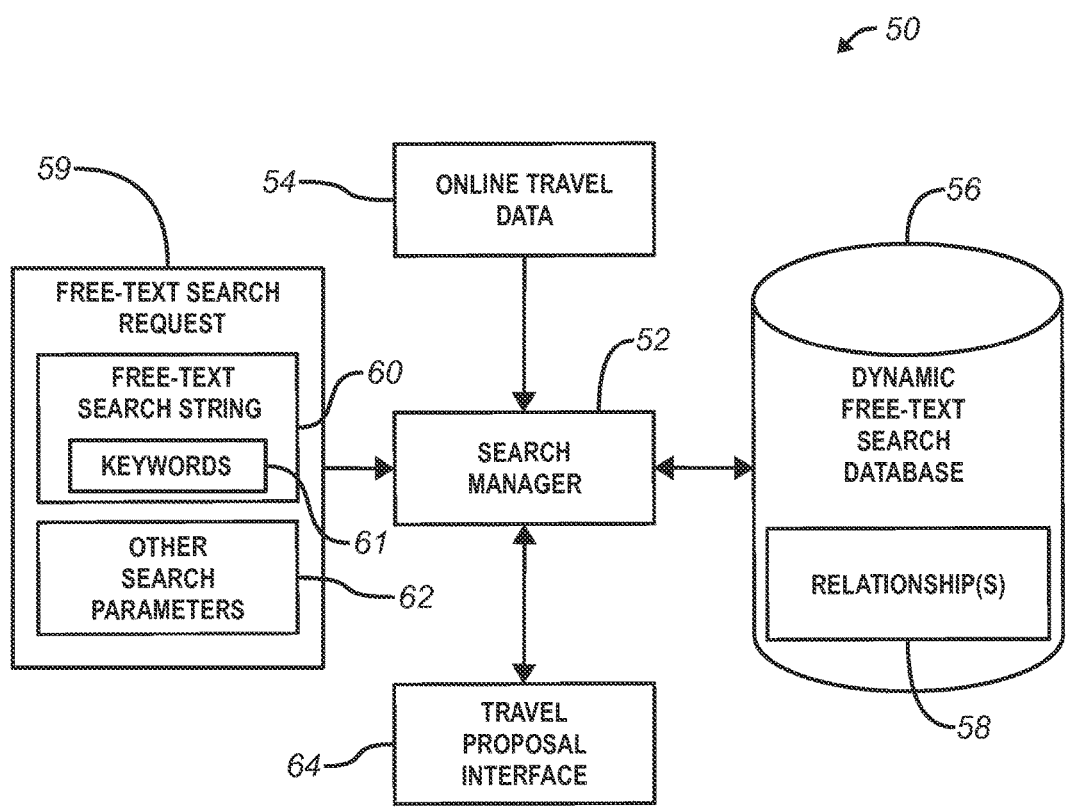
FIG. 3 is a schematic view of an exemplary processing architecture for implementing a dynamic free-text search database.

FIG. 3 illustrates an exemplary processing architecture 50 that may be provided by the service provider systems 12, the GDS 14, the user systems 16, the data provider systems 18, and/or the travel proposal system 20. The processing architecture 50 may include the dynamic free-text search database 56 for storing relationships 58, and may include a search manager 52.

The search manager 52 may operate to generate initial data for the dynamic free-text search database 56. To this end, the search manager 52 may retrieve online travel data 54 from various online sources, such as Wikipedia, trip advertisements, and social networking platforms, and determine associations from the data. Each association may include a free-text string linked to a trip. The search manager 52 may be configured to generate data representative of relationships 58 based on the associations, and transmit such data to the dynamic free-text search database 56.

The search manager 52 may be further configured to receive free-text search requests 59, such as from a user system 16 of the operating environment 10. As previously described, a free-text search request 59 may include generalized trip search criteria, but lack a specific destination or date. Upon receiving a free-text search request 59, the search manager 52 may query the dynamic free-text search database 56 for one or more relationships 58 matching the free-text search request 59. The returned relationships 58 may indicate travel proposals relevant to keywords 61 included in a free-text search string 60 of the free-text search request 59, such as "sunny", "beach", "skiing", and the like. The search manager 52 may thus determine appropriate travel proposals based on the one or more relationships 58 returned from the dynamic free-text search database 56, and thereafter display such travel proposals to a user via a travel proposal interface 64. The user may then choose a specific destination, select one or more dates, search available inventory, and/or book one or more reservations via the travel proposal interface 64.

In addition, the search manager 52 may dynamically update the relationships 58 of the dynamic free-text search database 56 to ensure that the relationships 58 remain accurate and meaningful. For example, the search manager 52 may receive a plurality of free-text search requests 59 and return one or more travel proposals for each of the free-text search requests 59 based on one or more of the relationships 58. The search manager 52 may then record a number of occurrences of potential events with respect to the returned travel proposals, such as whether a proposed destination is selected, whether a date is selected within a proposed date range, and/or whether a reservation is booked based on a returned travel proposal. The search manager 52 may then update one or more of the relationships 58 based on the number of occurrences of the potential events.

Figure 4:
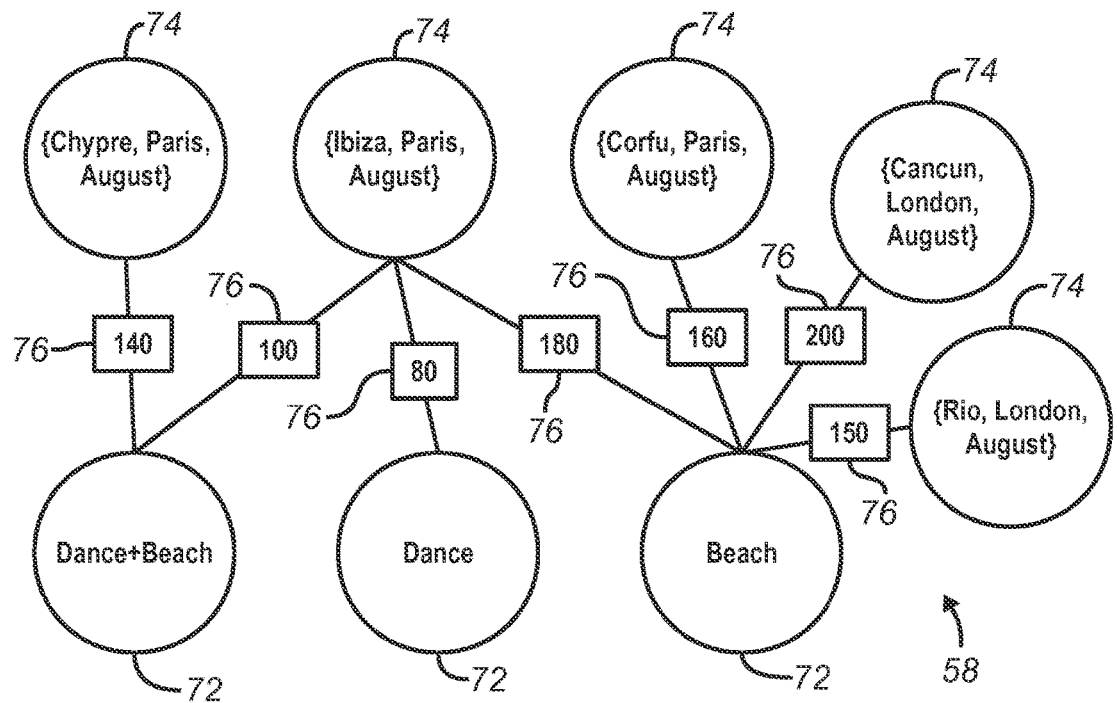
FIG. 4 is a schematic view of exemplary relationships that may be stored in the dynamic free-text search database of FIG. 3.

FIG. 4 illustrates relationships 58 that may be stored in the dynamic free-text search database 56. Each relationship 58 may include one or more keywords 72, a trip 74, and a weight 76. The trip 74 may include one or more of a destination, a point-of-sale, and one or more contextual parameters, such as a travel time frame, a search period (for comparison with the date in which an incoming search request is submitted), and/or a city of departure. For example, for the trip 74 including "Rio", Rio is the destination, August is the travel timeframe, and London is the point-of-sale.

The weight 76 of a given relationship 58 generally indicates the significance of the one or more keywords 72 of the given relationship 58 relative to the trip 74 of the given relationship 58. For example, a relationship 58 including the keyword 72 "beach" and a trip 74 having a destination of Cancun, a travel timeframe of August, and a point-of-sale of London may include a weight 76 of two hundred. Another relationship 58 including the keyword 72 "beach" and a trip 74 having a destination of Rio, a travel timeframe of August, and a point-of-sale of London may include a weight 76 of one hundred fifty. According to this example, the keyword "beach" is more significantly associated with the trip 74 involving Cancun than the trip 74 involving Rio, which may indicate that Cancun is a better destination than Rio for a potential traveler who is currently located in London and is looking for travel to a beach destination in August.

In one embodiment, the dynamic free-text search database 56 may include two or more relationships 58 that include the same trip 74, but different keywords 72. To promote efficient data storage, a single data instance of the common trip 74 may be stored in the dynamic free-text search database 56, and each of the keywords 72 of the two or more relationships 58 may be linked to the single data instance within the dynamic free-text search database 56. This situation is illustrated in FIG. 4 by the trip 74 that includes Ibiza as a destination. This trip 74 is linked to a grouping of keywords 72 that includes "Dance" and "Beach", which belongs to one relationship 58, and is also linked to the single keyword 72 "Dance", which belongs to another relationship 58.

In a further embodiment, the dynamic free-text search database 56 may include two or more relationships 58 that include the same keywords 72, but different trips 74. Again, to promote efficient data storage, and to promote faster identification of trips 74 matching a free-text search request 59, a single data instance of the common keywords 72 may be stored in the dynamic free-text search database 56, and each of the trips 74 of the two or more relationships 58 may be linked to the single data instance within the dynamic free-text search database 56. This situation is illustrated in FIG. 4 by the keyword 72 "Beach", which is linked to the trips 74 of four different relationships 58. Thus, upon searching in the dynamic free-text search database 56 for the keyword 72 "beach", the four trips 74 linked thereto will be readily apparent.

Figure 5:
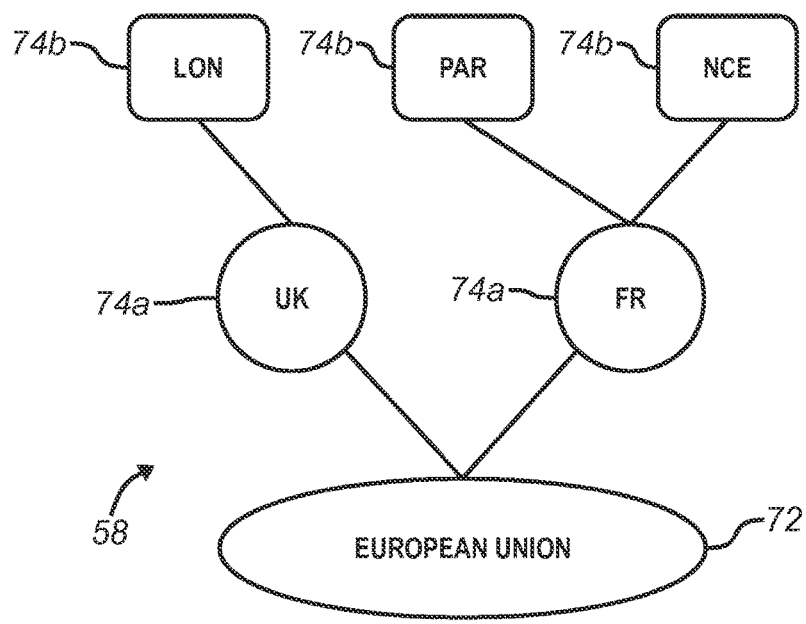
FIG. 5 is a schematic view of additional exemplary relationships that may be stored in the dynamic free-text search database of FIG. 3.

FIG. 5 illustrates other relationships 58 that may be stored in the dynamic free-text search database 56. As illustrated, some data instances may serve as keywords 72 to one relationship 58 and a trip 74 to other relationships 58. For example, one of the illustrated relationships 58 includes a keyword 72 of "European Union" that is linked to a trip 74a in which the UK is the destination. "European Union" also serves as the keyword 72 for another relationship 58 that has a trip 74a in which France is the destination. The trips 74a, however, may also serve as keywords for other relationships 58 that include trips 74b. Specifically, "UK" may serve as a keyword for a trip 74b to London, and "France" may serve as a keyword for a trip 74b to Paris and/or for a trip 74b to Nice. Such a tree-like hierarchy helps reduce electronic storage taken up by the relationships 58, and it also facilitates increasingly efficient searching when broader keywords are utilized in a free-text search request 59.

Figure 6:
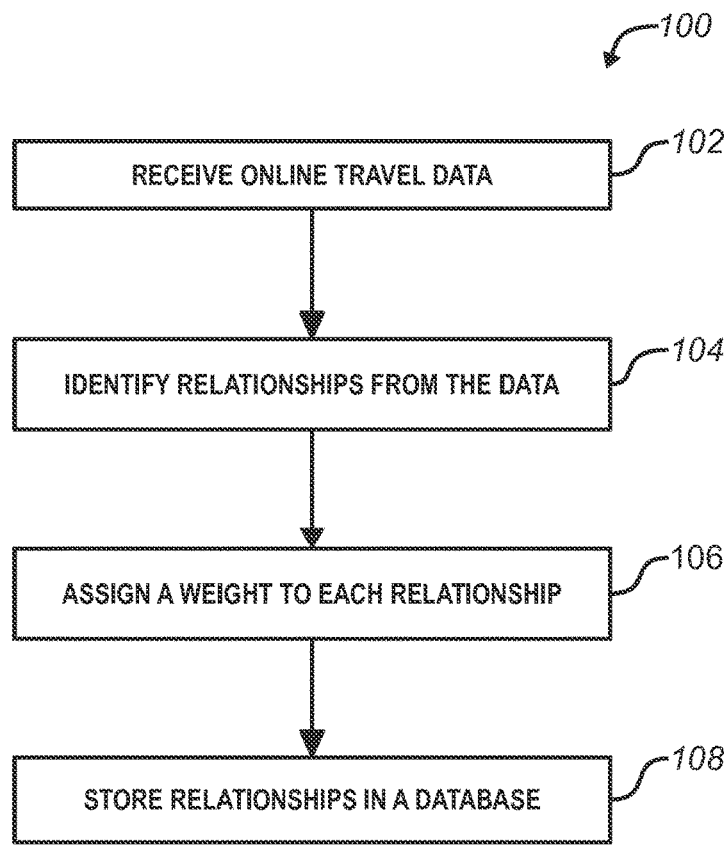
FIG. 6 is a flowchart of an exemplary process for generating data representative of relationships for the dynamic free-text search database of FIG. 3.

FIGS. 6-12 provide exemplary processes that may be performed by the processing architecture 50. FIG. 6 illustrates a process 100 for generating data representative of one or more relationships 58. To begin, online travel data 54 may be received (block 102). For example, the search manager 52 of the processing architecture 50 may scan one or more Internet resources such as Wikipedia, social medial platforms, and online trip advertisements for the online travel data 54.

Thereafter, the one or more relationships 58 may be identified from the online travel data 54 (block 104). More particularly, the search manager 52 may identify one or more associations from the online travel data 54, with each association including a free-text string linked to a trip. The free-text string of the association may include one or more keywords, and the trip of the association may include a destination, a point-of-sale, and/or other contextual data. For example, the online travel data 54 may include an association between the free-text string "sunny beaches", which includes the keyword "beach", and a trip including Cancun as a destination. For each association determined from the online travel data 54, the search manager 52 may extract one or more keywords from the free-text string of the association. The search manager 52 may then generate data representative of the relationships 58 based on the determined associations such that each relationship 58 includes the extracted one or more keywords and the trip of a determined association. Thus, continuing with the above example, the search manager 52 may generate data representative of a relationship 58 that includes a keyword 72 "beach" and a trip 74 having Cancun as a destination.

After or concurrently with the identification of the relationships 58, a weight 76 may be assigned to each of the relationships 58 such that each relationship 58 includes a respective weight 76 (block 106). In other words, the search manager 52 may generate data representative of the relationships 58, and each relationship 58 represented by the data may include a weight 76. As described above, the weight 76 of a given relationship 58 may indicate the significance of the one or more keywords 72 of the given relationship 58 relative to the trip 74 of the given relationship 58.

The search manager 52 may be configured to assign the weight 76 to each relationship 58 based on a variety of rules, which may be programmed into the search manager 52 in advance. More particularly, the search manager 52 may initially set the weight 76 of each relationship 58 as zero, and thereafter increase the weight 76 of each relationship 58 based on the rules. In one embodiment, the weight 76 assigned to a given relationship 58 may depend on the number of associations determined from the online travel data 54 that link the keywords 72 of the given relationship 58 to the trip 74 of the given relationship 58. For each such association, the search manager 52 may be configured to increase the weight 76 for the given relationship 58 by a value, which may also be programmed into the search manager 52 in advance.

In addition, the weight 76 assigned to a given relationship 58 may depend on the sources of the online travel data 54 on which identification of the given relationship 58 is based. For example, if the search manager 52 determines an association from a privately controlled source, such as an airline's website, then the search manager 52 may be configured to increase the weight 76 for a relationship 58 based on the association by a value that is greater than if the association was determined from a publicly accessible or less reputable source, such as Wikipedia.

The weight 76 assigned to a given relationship 58 may also depend on the type of keywords 72 of the relationship 58. For example, if a keyword 72 of a given relationship 58 is a geographical region name, such as "Europe", and the trip 74 of the given relationship 58 includes a destination within that region, then the keyword 72 of the given relationship 58 is usually quite significant relative to the trip 74 of the given relationship 58. Conversely, a keyword 72 such as "beach" may be of lesser, equal, or more significance relative to the trip 74 of the given relationship 58. Hence, when a given relationship 58 includes keywords 72 containing a geographical region and includes a trip 74 having a location in that region as a destination, the search manager 52 may be configured to increase the weight 76 for the given relationship 58 by a value, which may be predetermined, that is greater than if the keywords 72 of the given relationship 58 do not include a geographical region.

Once the relationships 58 have been created, and a weight 76 has been assigned to each relationship 58, the data representative of the relationships 58 may be stored in a database (block 108). More particular, the search manager 52 may transmit the data representative of the relationships 58 to the dynamic free-text search database 56 of the processing architecture 50. At least one data storage device, such as the mass storage memory device 32 of the computer 26, may host the dynamic free-text search database 56. A connection for data communication may be established between the at least one data storage device and the search manager 52, and the data representative of the relationships 58 may be transmitted from the search manager 52 to the at least one data storage device that hosts the dynamic free-text search database 56 via the established connection.

Figure 7:
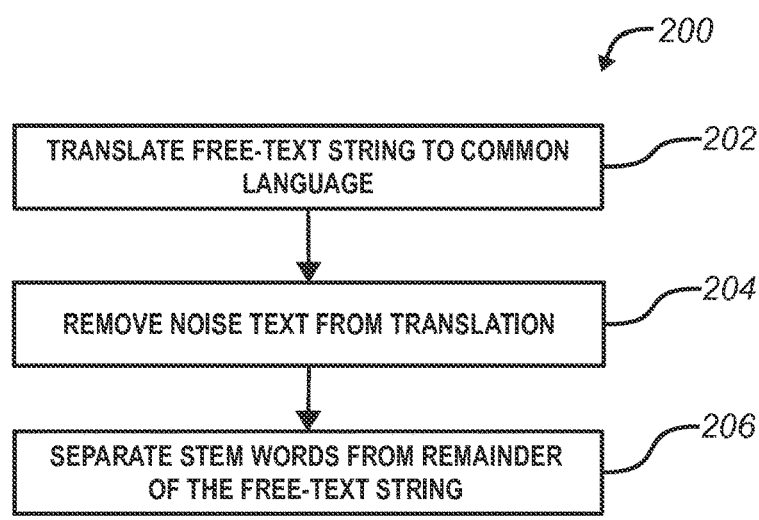
FIG. 7 is a flowchart of an exemplary process for extracting keywords from a free-text string.

FIG. 7 illustrates a process 200 for extracting keywords from a free-text string, which may be performed in block 104 of the process 100 to identify the relationships 58 from the online travel data 54. To begin, a free-text string may be translated to a common language (block 202). In particular, the search manager 52, upon receiving a free-text string, may be configured to translate the string to a language that is familiar to the search manager 52. For example, the search manager 52 may be programmed to extract keywords from English-written text exclusively, and so if a free-text string is written in French, the search manager 52 may translate the string to English for extraction of the keywords. In this way, the online travel data 54 on which the search manager 52 bases the relationships 58 is not limited to a single language, which enables the processing architecture 50 to create an increasingly comprehensive database of relationships 58. Moreover, when a user submits a free-text search request 59 to the search manager 52, which is described in more detail below, the free-text search string 60 of the free-text search request 59 may be written in one or more of a plurality of languages, which renders the processing architecture 50 increasingly accessible to different users.

After the free-text string has been translated into a common language, noise text may be removed from the translated string (block 204). Noise text may include terms that have little substantive value relative to a trip 74 of a relationship 58. For example, numbers and/or terms such as "a", "to", "and", etc. generally fail to indicate significance relative to a trip 74. Hence, in order to minimize electronic data storage occupied by the keywords 72 of the relationships 58, and to avoid the need to search such insignificant terms when a free-text search request 59 is received, the search manager 52 may remove these noise terms from the free-text string.

Keywords may then be extracted from the remainder of the free-text string (block 206). More particularly, each of the terms remaining in the free-text string may include a stem word with some addition and/or modification, such as a prefix or a postfix. In general, the addition and/or modification may add little substantive value to the keyword. For example, the term "sunny" may include the stem word "sun" and the postfix "ny". The search manager 52 may thus extract the stem words from the remainder of the free-text string, and utilize the extracted stem words as keywords 72. In this way, electronic data storage occupied by the keywords 72 of the relationships 58 may again be minimized by avoiding the storage of variations of the same keyword 72. Moreover, searching among the keywords 72 is faster because searching mere variations of a same keyword 72 does not occur.

Figure 8:
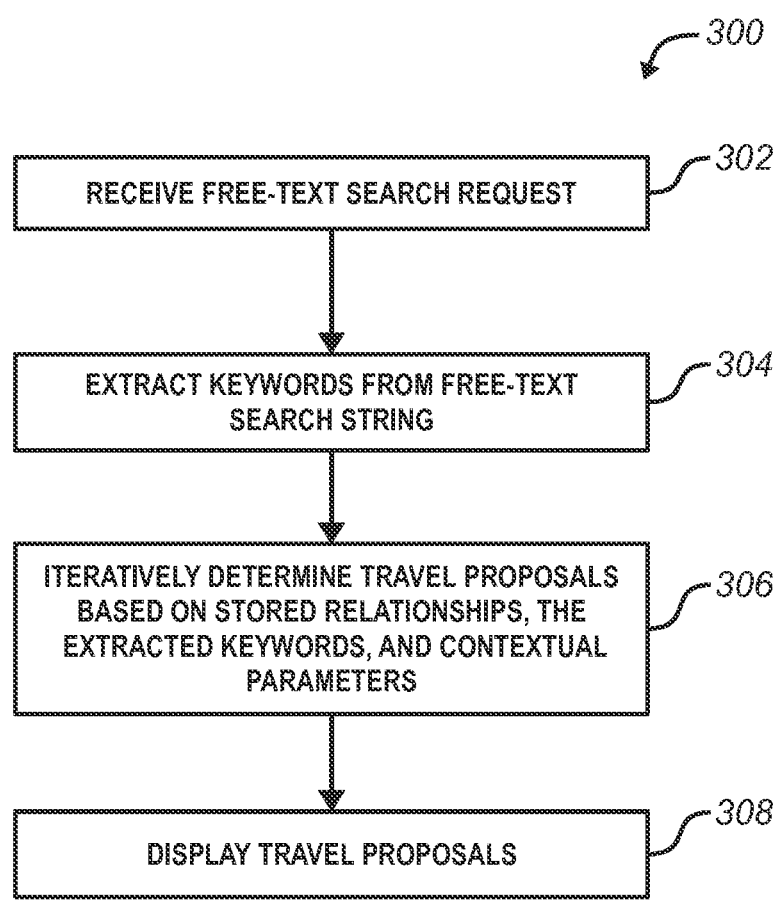
FIG. 8 is a flowchart of an exemplary process for responding to a free-text search request.

FIG. 8 illustrates a process 300 for responding to a free-text search request 59. To begin, a free-text search request 59 may be received (block 302), such as at the search manager 52. As described above, the free-text search request 59 may include a free-text search string 60 entered by a user, such as via a user system 16 of the operating environment 10. The free-text search string 60 is not limited to any particular format, language, and/or substance. The free-text search request 59 may also include other search parameters 62, such as a point-of-sale (i.e., the location of the user issuing the free-text search request), information about the requesting user, and/or search criteria captured from data entry fields specifically configured to receive a certain type of search criteria in a specified format (e.g., search criteria entered by the user via selection within a pre-populated drop-down list). For example, such captured search criteria may include a budget, a data range, a region, activities, a destination, etc. After the free-text search request 59 is received, one or more keywords 61 may be extracted from the free-text search string 60 (block 304). The search manager 52 may perform this extraction using the process 200 described above.

After the one or more keywords 61 have been extracted, travel proposals may be iteratively determined based on the relationships 58 stored in the dynamic free-text search database 56, the extracted keywords 61, and/or the other search parameters 62 of the free-text search request 59 (block 306). To this end, the search manager 52 may traverse the relationships 58 of the dynamic free-text search database 56 in multiple iterations to resolve, at a minimum, a preset number of relationships 58 as candidates for the free-text search request 59. Under this embodiment, in the n'th iteration, the search manager 52 may resolve a given relationship 58 for the free-text search request 59 if the total number of differences between the given relationship 58 and the free-text search request 59 is no more than n−1.

In one embodiment, the search manager 52 may compute the total number of differences between a given relationship 58 and a free-text search request 59 by adding together (1) the number of differences between the keywords 61 of the free-text search request 59 and the keywords 72 of the given relationship 58 and (2) the number of differences between the other search parameters 62 of the free-text search request 59 and the trip 74 of the given relationship 58. The number of differences between the keywords 61 of a free-text search request 59 and the keywords 72 of a given relationship 58 may equal the number of keywords 61 not present in the keywords 72 plus the number of keywords 72 not present in the keywords 61. The number of differences between the other search parameters 62 of a free-text search request 59 and a trip 74 of a given relationship 58 may equal the number of other search parameters 62 that are not present in the trip 74.

Thus, in a first iteration of responding to a free-text search request 59, the search manager 52 may search for relationships 58 that include keywords 72 exactly matching the extracted keywords 61 of the free-text search request 59 (i.e., the relationship 58 includes no keywords 72 other than the keywords 61 of the free-text search request 59) and a trip 74 having all of the other search parameters 62 of the free-text search request 59. If the search manager 52 is unable to resolve at least a preset number of relationships 58 in the first iteration, the search manager 52 may perform a second iteration whereby the search manager 52 searches for relationships 58 that include keywords 72 exactly matching the extracted keywords 61 of the free-text search request 59 and a trip 74 having all but one of the other search parameters 62 of the free-text search request 59; or relationships 58 that include all of the other search parameters 62 of the free-text search request 59 and keywords 72 differing from the extracted keywords 61 of the free-text search request 59 by one (i.e., the relationship 58 includes as keywords 72 all but one of the extracted keywords 61 and no more, or includes as keywords 72 all of the extracted keywords 61 and one additional keyword 72). Again, if the search manager 52 is unable to resolve at least the preset number of relationships 58 after the first and second iterations, then the search manager 52 may perform a third iteration, and so on.

The search manager 52 may continue performing iterations until at least the preset number of relationships 58 have been resolved. To this end, after each iteration, the search manager 52 may check whether at least the preset number of relationships 58 have been resolved. If so, then the search manager 52 may rank the resolved relationships 58 based on the weight 76 of each relationship 58 such that a higher weight 76 corresponds to a higher ranking. The search manager 52 may then select a number of the top ranked resolved relationships 58 that is equal to the preset number, and determine travel proposals based on the trips 74 of the selected top ranked relationships 58. For example, if a trip 74 of a selected top ranked relationship 58 includes a given destination and travel timeframe, then a travel proposal based on that trip 74 may include the given destination and travel timeframe of the trip 74.

If the search manager 52 resolves a relationship 58 in a subsequent iteration, which implies that the resolved relationship 58 differs from the free-text search request 59, then the search manager 52 may be configured to reduce the weight 76 of the relationship 58 for the purposes of ranking In one embodiment, the search manager 52 may reduce the weight 76 of the relationship 58 by a percentage equal to the total differences between the free-text search request 59 and the relationship 58 relative to the total number of keywords 72 and elements in the trip 74 of the relationship 58, where an element of the trip 74 may include a destination, a point-of-sale, and any one of the contextual parameters contained therein. So, for example, if the weight 76 of a resolved relationship 58 is one hundred, the total number of differences between the free-text search request 59 and the resolved relationship 58 is one, and the resolved relationship 58 includes one keyword 72 and a trip 74 having three elements, then the weight 76 may be reduced by ¼ or 25% to a value seventy five.

In another embodiment, the search manager 52 may reduce the weight 76 by a percentage equal to the number of differences between the keywords 61 of the free-text search request 59 and the keywords 72 of the relationship 58 relative to the total number of keywords 72, and then reduce this result by a percentage that is equal to the number of differences between the other search parameters 62 of the free-text search request 59 and the trip 74 of the relationship 58 relative to the number of elements in the trip 74. Alternatively, these operations may be reversed. In yet another embodiment, the search manager may also separately calculate these reductions based on the original weight 76, and thereafter reduce the original weight 76 by the sum of the calculated reductions.

An example of iteratively determining travel proposals will now be described with reference to the relationships 58 illustrated in FIG. 4, assuming that three is the preset number of relationships 58 that need be resolved, at minimum, and utilized to determine the travel proposals. If the search manager 52 receives a free-text search request 59 that includes a free-text search string 60 reciting "beach" and an other search parameter 62 indicating that Paris is the point-of-sale, in a first iteration, the search manager 52 may resolve two relationships 58: (1) the relationship 58 including Ibiza as a destination and a weight 76 of one hundred eighty; and (2) the relationship 58 including Corfu as a destination and a weight 76 of one hundred sixty. Each of these relationships 58 includes no more and no less keywords 72 than "beach" and includes a trip 74 with Paris as the point-of-sale. Accordingly, there are no "differences" between these relationships 58 and the free-text search request 59.

Continuing with the above example, because the search manager 52 may only resolve two relationships 58 in the first iteration, and the preset number of minimum relationships 58 that need be resolved is three, the search manager 52 may proceed to perform a second iteration to resolve at least one more relationship 58. In the second iteration, the remaining relationships 58 may be searched for those including the other search parameter 62 of the free-text search request 59 and keywords 72 differing from the keyword 61 of the free-text search request 59 by one; or those including as keywords 72 only the keyword 61 of the free-text search request 59 and a trip 74 missing the other search parameter 62 of the free-text search request 59.

The relationship 58 including the destination Rio and a weight 76 of one hundred fifty has a single keyword 72 of "beach", which exactly matches the keyword 61 of the free-text search request 59, and has a trip 74 that does not have the other search parameter 62 of the free-text search request 59, namely a point-of-sale of Paris. The search manager 52 may therefore resolve this relationship 58 in the second iteration. However, because this relationship 58 includes a trip 74 that has three elements and differs from the other search parameter 62 of the free-text search request 59 by one (i.e., London vs. Paris as a point-of-sale), the search manager 52 may reduce the weight 76 of the relationship 58 by one-third for the purposes of ranking Thus, the weight 76 of this relationship 58 including the destination of Rio may be reduced to one hundred.

The relationship 58 including Cancun as a destination and a weight 76 of two hundred also has a single keyword 72 of "beach", which exactly matches the keyword 61 of the free-text search request 59, and has a trip 74 that does not have the other search parameter 62 of the free-text search request 59, namely a point-of-sale of Paris. The search manager 52 may therefore also resolve this relationship 58 in the second iteration. However, because this relationship 58 includes a trip 74 that has three elements and differs from the other search parameter 62 of the free-text search request 59 by one (i.e., London vs. Paris as a point-of-sale), the search manager 52 may reduce the weight 76 of this relationship 58 by one-third for the purposes of ranking. Accordingly, the weight 76 of this relationship 58 including Cancun as a destination may be reduced to one hundred thirty three (133).

In addition, the relationship 58 including Chypre as a destination and a weight 76 of one hundred forty includes the other search parameter 62 of the free-text search request 59, includes the keyword 72 "beach", and also includes one additional keyword 72 (i.e., "dance"). Hence, the search manager 52 may also resolve this relationship 58 in the second iteration. However, because this relationship 58 includes two keywords 72 and differs from the keyword 61 of the free-text search request 59 by one, the search manager 52 may reduce the weight 76 of this relationship 58 by one-half for the purposes of ranking Hence, the weight 76 of this relationship 58 including Chypre as a destination may be reduced to one hundred twenty five.

Hence, in this example, the search manager 52 resolves five relationships 58 after the second iteration. The top three of these relationships 58 by weight, taking all reductions into account, include those having a trip 74 to Corfu in August, a trip 74 to Ibiza in August, and a trip 74 to Cancun in August. These trips 74 may be utilized for presenting the travel proposals in response to the free-text search request 59.

Returning to FIG. 8, once determined, the travel proposals may be displayed to a user (block 308), such as via the user system 16 of the operating environment 10. In one embodiment, the search manager 52 may generate a travel proposal interface 64 that indicates the determined travel proposals. For example, the travel proposal interface 64 may include a map display with each destination of the determined travel proposals circled or otherwise highlighted. In addition, the travel proposal interface 64 may include a histogram display that includes the travel timeframe of each determined travel proposal. A user may utilize the travel proposal interface 64 to select one of the destinations from the map display, select one or more dates on the histogram display, search for available flights or other accommodations based on the selections, and book a trip. In some embodiments, the travel proposal interface 64 may show the histogram display in response to selection of a destination on the map, the shown histogram display including the travel timeframe of the travel proposal for the selected destination. Alternatively, the process may work in reverse, meaning that the travel proposal interface 64 may show the map in response to selection of one or more dates on the histogram display, the map including destinations of travel proposals including the selected dates. Moreover, the travel proposal interface 64 may be configured to go to an upsell page, in which a user may search for and/or book flights and other accommodations, in response to one or more dates being selected on the histogram display and/or a destination being selected on the map.

Figure 9:
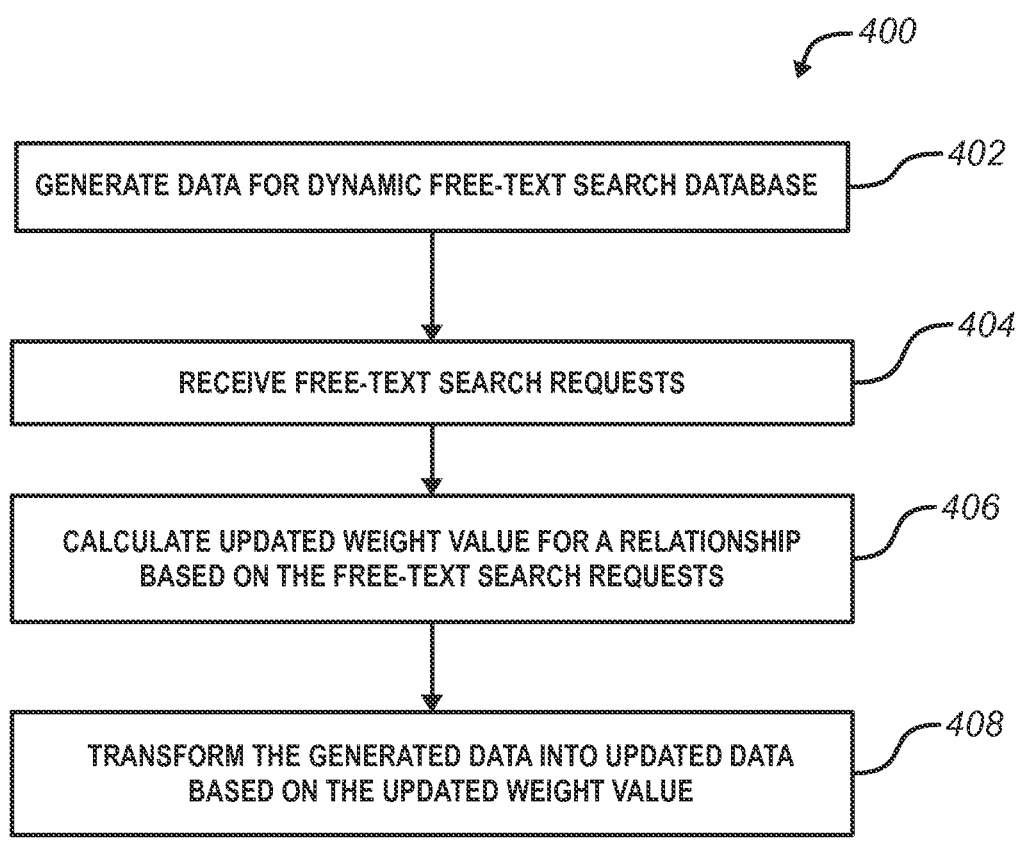
FIG. 9 is a flowchart of an exemplary process for dynamically updating a relationship in the dynamic free-text search database of FIG. 3.

FIG. 9 illustrates a process 400 for dynamically updating the weight 76 of a relationship 58 stored in the dynamic free-text search database 56 based on a period of received free-text search requests 59. To begin, initial data may be generated for the dynamic free-text search database 56 (block 402). The data may represent one or more relationships 58 that include at least one keyword 72, a trip 74, and a weight 76. The search manager 52 may generate the initial data utilizing the process 100 described above. Thereafter, one or more free-text search requests 59 may be received (block 404), such as at the search manager 52 from the user systems 16 of the operating environment 10. As previously described, each of the free-text search requests 59 may include a free-text search string 60, which may be written in natural language and is not confined to any particular format, language, or substance.

After all the free-text search requests 59 of the designated period have been received, responded to, and processed, which may include tracking the occurrence of events with respect to the travel proposals returned for the free-text search requests 59, an updated weight 76 may be calculated for a given relationship 58 based on the received free-text search requests 59 (block 406), or more particularly the processing of the received free-text search requests 59. The updated weight 76 calculated for the given relationship 58 may differ from the original weight 76 assigned to the given relationship 58. The previously generated data of block 402 may then be transformed into updated data based on the updated weight 76 (block 408). In particular, the search manager 52 may update the previously generated data by inserting the updated weight 76 into the previously generated data and removing the old weight 76 for the given relationship 58. In this way, the updated data may represent the given relationship 58 of the previously generated data, but with the updated weight 76.

Figure 10:
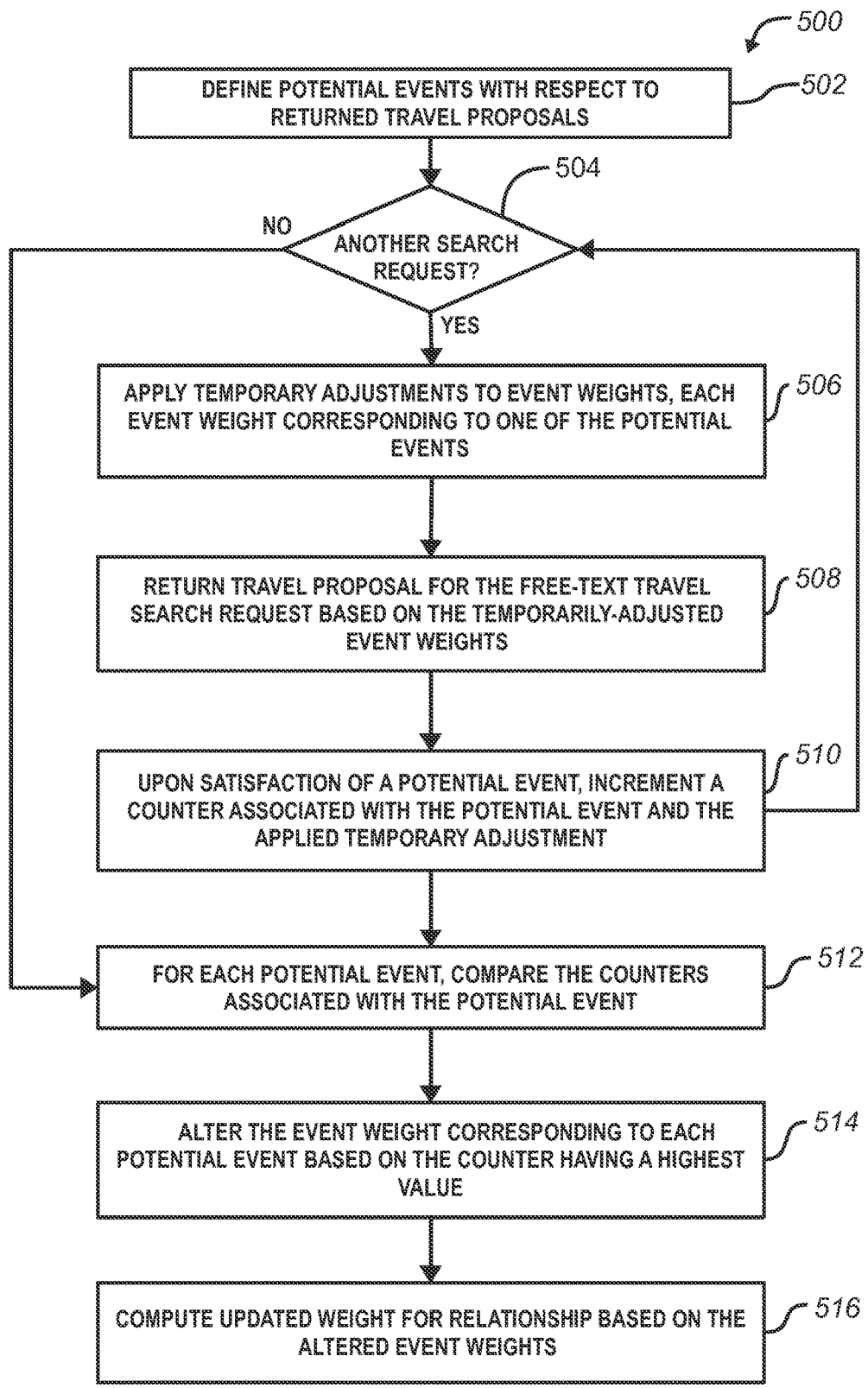
FIG. 10 is a flowchart of an exemplary process for calculating an updated weight for a relationship stored in the dynamic free-text search database of FIG. 3 based on a period of received free-text search requests.

FIG. 10 illustrates a process 500 for calculating an updated weight 76 for a given relationship 58 based on the received free-text search requests 59 (block 406 of process 400). To begin, a plurality of potential events may be defined for the given relationship 58 (block 502). Each defined event may include an action that may occur with respect to a travel proposal returned based on the given relationship 58 in reply to a free-text search request 59. For example, one event may include the action of a user selecting a destination of the returned travel proposal, such as via the map display of the travel proposal interface 64. Another event may include the action of a user selecting one or more dates within the travel timeframe of the returned travel proposal, such as via the histogram display of the travel proposal interface 64. Another event may include the action of a user booking a trip based on the returned travel proposal.

After an initial weight 76 is assigned to a relationship 58, the search manager 52 may utilize the events defined for the relationship 58 to dynamically update the weight 76 of the relationship 58. Specifically, the search manager 52 may calculate an updated weight 76 for the relationship 58 using the following formula:

$$\text{weight} = \Sigma_{i=1 \text{ to } n} N(i) w(i) \quad \text{(Equation A)}$$

where n equals the number of events that may occur with respect to a returned travel proposal based on the relationship 58, N(i) is the number of times the $i^{th}$ event has occurred over a period of received free-text search requests 59, and w(i) is the weight corresponding to the $i^{th}$ event. When an event occurs with respect to a returned travel proposal based on a relationship 58, the occurrence may generally indicate that the search manager 52 properly resolved the relationship 58 when responding to a received free-text search request 59. Accordingly, Equation A is configured such that, the more an event occurs with respect to a returned travel proposal based on the relationship 58, the higher the weight 76 of the relationship 58 so as to increase the likelihood that the search manager 52 continues to resolve the relationship 58 when appropriate. Moreover, the weight w(i) associated with each event may indicate the significance of the event relative to the weight 76 of the relationship 58. For example, a booking event may be associated with a higher weight w(i)

than a destination selection event, as the booking event may more strongly indicate that the search manager 52 properly resolved the relationship 58. As described in further detail below, the weight w(i) for each event may be dynamically updated based the occurrence of the events over a period of received free-text search requests 59.

In one embodiment, the weight calculated in Equation A may be utilized as the updated weight 76 for the relationship 58. Alternatively, the sum of the weight calculated in Equation A and the previous weight 76 of the relationship 58 may be utilized as the updated weight 76 for the relationship 58. In yet another alternative, the product of the weight calculated in Equation A and the previous weight 76 of the relationship 58 may be used as the updated weight 76 for the relationship 58.

Returning to the process 500 of FIG. 10, after the potential events have been defined for the given relationship 58 to be updated, it may be determined whether the period of free-text search requests 59 is over (block 504). More particularly, the period may define a number of free-text search requests 59 on which the search manager 52 is to base calculation of an updated weight 76 for the given relationship 58. For example, the period may indicate that the search manager 52 should calculate the updated weight 76 based on one thousand received free-text search requests 59. In other words, in this example, the updated weight 76 should not be calculated until one thousand free-text search requests 59 have been received and processed by the search manager 52. As a further example, the period may indicate that the search manager 52 should calculate the updated weight 76 based on one received free-text search request 59. In this way, the weight 76 for a given relationship 58 may be recalculated or updated every time a free-text search request 59 is received.

If the period of free-text search requests 59 is not yet over, then when another free-text search request 59 is received ("YES" branch of block 504), a temporary adjustment may be made to the event weights w(i) corresponding to the events defined for the given relationship 58 to be updated (block 506). In particular, the search manager 52 may apply the following Equation each event weight:

$$r(i) = w(i) + KV/100 \quad \text{(Equation B)}$$

where w(i) is the original event weight corresponding to the $i^{th}$ event, K is a randomly selected value, such as −1, 0, or 1, V is a learning speed, and r(i) is the temporarily adjusted weight for the $i^{th}$ event.

After the event weights have been temporarily adjusted, one or more travel proposals may be returned for the received free-text search request 59 based, at least in part, on the temporarily adjusted event weights (block 508). In particular, the search manager 52 may calculate a temporary weight 76 for the given relationship 58 to be updated using Equation A and the temporarily adjusted event weights, and may thereafter return one or more travel proposals based on resolved relationships 58, which may include the given relationship 58 to be updated, using the process 300.

Upon the satisfaction of a potential event with respect to a travel proposal returned based on the given relationship 58 to be updated, a counter associated with the event may be incremented (block 510). Specifically, each of the potential events defined for the given relationship 58 to be updated may be associated with a plurality of counters, each of the plurality of counters being further associated with one of a plurality of possible temporary adjustments that may be applied to the weights w(i) corresponding to the events. Thus, when one of a plurality of possible temporary adjustments have been applied to the event weights corresponding to the events defined for the given relationship 58 to be updated, and a travel proposal is thereafter returned based on the given relationship 58 to be updated, then upon the occurrence of a potential event, the counter associated with that event and the applied temporary adjustment may be incremented. In this way, the counters associated with the potential events track both the number of occurrences of each potential event and the temporary adjustments leading to the occurrence of the potential events.

Hence, in Equation B, where the temporary adjustment applied on the weights w(i) depends on the value of K, each potential event may have a counter associated with the situation where K=1, a counter associated with the situation where K=0, and a counter associated with the situation where K=−1. Thus, upon satisfaction of a potential event with respect to a returned travel proposal based on the given relationship 58 to be updated, if the travel proposal was returned when a temporary adjustment corresponding to K=0 was applied, then the counter for the satisfied potential event associated with the situation in which K=0 is incremented. In other words, upon satisfaction of a potential event with respect to a returned travel proposal based on the given relationship 58 to be updated, the search manager 52 may increase the value of the counter associated with both the potential event and the temporary adjustment on which the return of the travel proposal was based.

Once the set period of free-text search requests 59 is over ("NO" branch of block 504), for each potential event defined for the given relationship 58 to be updated, the counters associated with the potential event may be compared (block 512). In particular, the search manager 52 may determine the highest counter for each defined potential event. Thereafter, the event weight w(i) corresponding to each potential event may be altered according to the temporary adjustment associated with the counter associated with the potential event having the highest value (block 514). Thus, for a given potential event, if the counter corresponding to the situation where K=1 has the highest value after the set period of free-text search requests 59 is over, then the search manager 52 may adjust the weight w(i) associated with the given potential event by adding KV/100, where K=1, to the current weight w(i) associated with the given potential event. Once the event weight corresponding to each potential event has been altered (that is, unless the highest counter associated with a potential event is associated with the situation in which K=0), the updated weight 76 for the given relationship 58 to be updated may be calculated based on the altered event weights and the number of times the potential events defined for the relationship 58 were satisfied during the set period of the free-text search requests 59 (block 516), such as by using Equation A.

Figure 11:
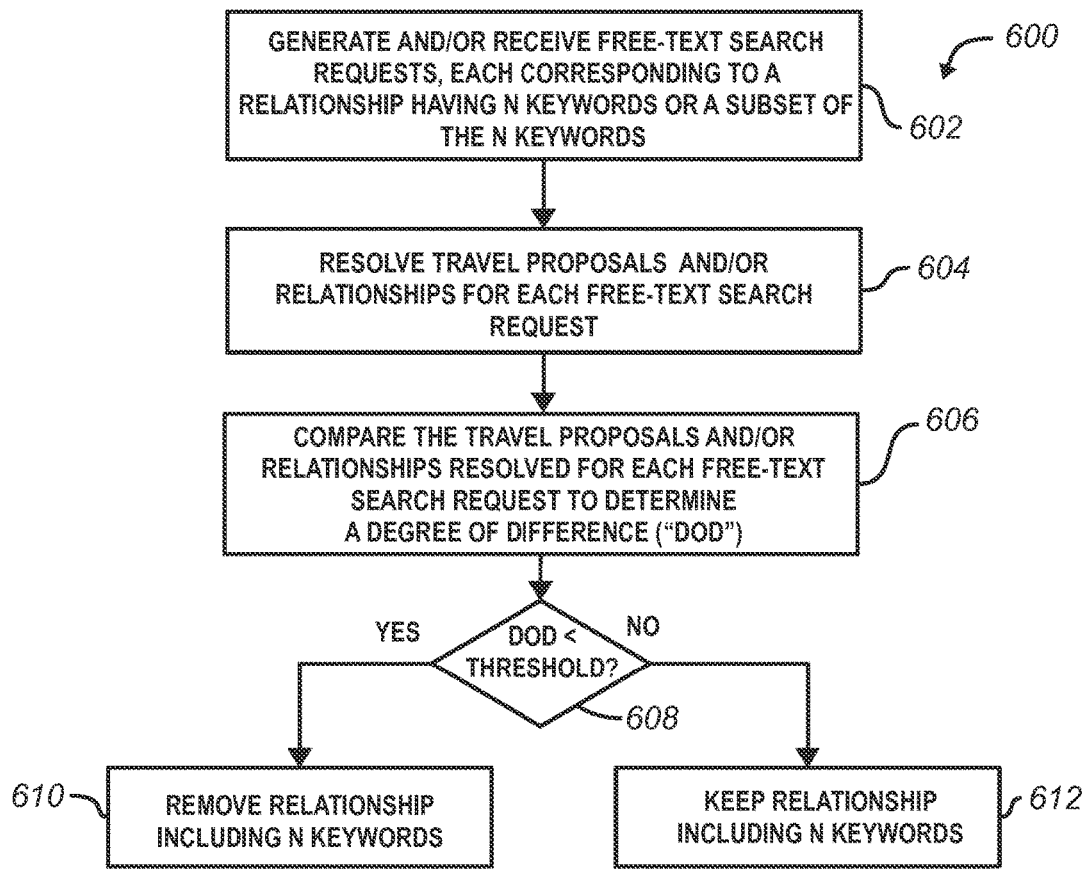
FIG. 11 is a flowchart of an exemplary process for removing non-meaningful relationships from the dynamic free-text search database of FIG. 3.

FIG. 11 illustrates an exemplary process 600 for reducing the number of keywords 72 stored in the dynamic free-text search database 56 by utilizing statistic correlation between the keywords 72 of different relationships 58. More particularly, the process 600 may facilitate the removal of relationships 58 that are non-meaningful, which may free up electronic storage space and reduce search time for received free-text search requests 59. For the purposes of this example, it may be assumed that one relationship 58 in the dynamic free-text search database 56 includes N keywords 72, another relationship 58 in the dynamic free-text search database includes as keywords 72 only a subset of the N keywords 72, and another relationship 58 stored in the dynamic free-text search database 56 includes as keywords 72 only those of the N keywords 72 that are not in the subset of the previous relationship 58. These relationships 58 may be referred to hereafter as the "assumed relationships" for the purposes of this example.

To begin, free-text search requests 59 may be internally generated and/or received that correspond to each of the assumed relationships 58 set forth above (block 602). More particularly, each of these free-text search requests 59 may include a free-text string having the N keywords 72, the subset of N keywords 72, or those of the N keywords 72 that are not in the subset, respectively. Travel proposals and/or relationships 58 may then be resolved for each of the free-text search requests 59, such as by using the process 300 described above (block 604). Thereafter, the travel proposals and/or relationships 58 resolved for each of the free-text search requests 59 may be compared to determine a degree of difference ("DOD") between the resolved travel proposals and/or relationships 58 (block 606).

If the DOD between the travel proposals and/or relationships 58 resolved for the free-text search request 59 having the N keywords 72 and travel proposals and/or relationships 58 resolved for each of the other free-text search requests 59 is zero, or is below a predetermined threshold ("NO" branch of block 608), then there may be no meaningful difference between the relationship 58 including the N Keywords 72 and the other relationships 58 assumed above to be in the dynamic free-text search database 56. In other words, there may be a low correlation within the dynamic free-text search database 56 between the subset of N keywords 72 and those of the N keywords 72 that are not in the subset. Accordingly, in order to reduce the amount of stored data and increase computation efficiency by having less relationships 58 to search, the search manager 52 may remove the relationship 58 including all N keywords 72 from the dynamic free-text search database 56, but keep the other assumed relationships 58 intact (block 610). Alternatively, if the DOD is greater than or equal to the predetermined threshold ("YES" branch of block 608), then the correlation within the dynamic free-text search database 56 between the subset of N keywords 72 and those of the N keywords 72 that are not in the subset may be high, such that there is a meaningful difference between the relationship 58 including the N Keywords 72 and the other assumed relationships 58 within the dynamic free-text search database 56. In this case, the search manager 52 may thus maintain the relationship 58 including all N keywords 72 in the dynamic free-text search database 56, as well as the other assumed relationships 58 (block 612).

Figure 12:
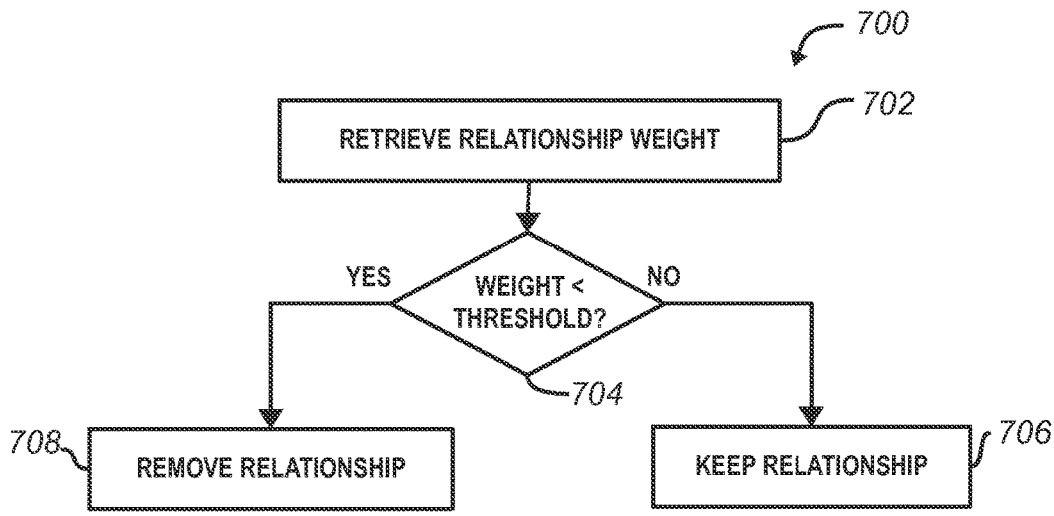
FIG. 12 is a flowchart of another exemplary process for removing non-meaningful relationships from the dynamic free-text search database of FIG. 3.

FIG. 12 illustrates another process 700 for reducing the number of keywords 72 stored in the dynamic free-text search database 56 by removing non-meaningful relationships 58. If, after a configurable time, a relationship 58 has not led to the occurrence of any event, then the weight 76 of the relationship 58 may decrease, such as via the process 400 described above. Specifically, the counters associated with the potential events defined for the relationship 58 may not increase or may increase insignificantly, which may reduce the weight 76 of the relationship 58 towards zero. Thus, in order remove such a relationship 58 from the dynamic free-text search database 56, the weight 76 of the relationship 58 may be retrieved (block 702). If the weight 76 is below a set threshold, the search manager 52 may remove the relationship 58 from the dynamic free-text search database 56 (block 708). Conversely, if the retrieved weight 76 is greater than (or equal) to the set threshold, the search manager 52 may maintain the relationship 58 in the dynamic free-text search database 56 (block 706).

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for implementing a dynamic free-text search database, the method comprising:
    providing first data for the dynamic free-text search database that represents a first relationship including a first keyword, a first trip, and a first weight value;
    receiving, by the at least one processor, a plurality of free-text search requests;
    defining a plurality of potential events that may occur with respect to a travel proposal returned in reply to the free-text search requests based on the first relationship;
    returning one or more travel proposals for each of the free-text search requests based on the first relationship;
    recording a number of occurrences of each potential event with respect to the one or more travel proposals returned for the free-text search requests;
    computing, by the at least one processor, a second weight value for the first relationship based on the number of occurrences, wherein the second weight value differs from the first weight value; and
    transforming, by the at least one processor, the first data into second data by inserting the second weight value into the first data such that the first relationship includes the second weight value.

2. The method of claim 1, further comprising:
    establishing a connection for data communication between at least one data storage device and a travel proposal system that includes the at least one processor, wherein the at least one data storage device hosts the dynamic free-text search database; and
    transmitting the first data from the pricing system to the at least one data storage device via the connection.

3. The method of claim 1, wherein the first trip comprises a destination location, a point-of-sale, and one or more contextual parameters.

4. The method of claim 1, wherein returning the one or more travel proposals for each of the free-text search requests based on the first relationship comprises:
    for each free-text search request:
        applying a temporary adjustment to a plurality of event weights to define temporarily-adjusted event weights, wherein each event weight corresponds to one of the potential events, and
        returning the one or more travel proposals for the free-text search request based on the temporarily-adjusted event weights.

5. The method of claim 4, wherein each potential event is associated with a plurality of counters, each counter is associated with a potential temporary adjustment, and recording the number of occurrences of each potential event with respect to the one or more travel proposals returned for the free-text search requests comprises:
    upon satisfaction of the potential event with respect to any one of the one or more travel proposals returned for the free-text search requests, incrementing a value of the counter associated with both the potential event and the potential temporary adjustment that matches the temporary adjustment on which return of the travel proposal satisfying the potential event was based.

6. The method of claim 5, wherein computing the second weight value for the first relationship based on the number of occurrences comprises:
    for each potential event:
        comparing the counters associated with the potential event, and
        altering the event weight corresponding to the potential event based on the potential temporary adjustment associated with the counter that is associated with the potential event having a highest value; and
    computing the second weight value for the first relationship based on the altered event weight corresponding to each potential event.

7. The method of claim 1, wherein providing the first data for the dynamic free-text search database comprises:
    determining an association from one or more online sources, wherein the association includes a free-text string linked to a third trip;
    extracting a third keyword from the free-text string; and
    creating the first data such that the first keyword and the first trip of the first relationship respectively correspond to the third keyword and the third trip.

8. The method of claim 1, wherein the dynamic free-text search database comprises additional data that represents a second relationship, the second relationship including a second trip, a third weight value, and the first keyword of the first relationship represented by the first data, and further comprising:

storing a single data instance of the first keyword in the dynamic free-text search database such that the first trip of the first relationship and the second trip of the second relationship are linked in the dynamic free-text search database to the single data instance.

9. The method of claim 1, wherein the dynamic free-text search database comprises additional data that represents a second relationship, the second relationship including a second keyword, a third weight value, and the first trip of the first relationship represented by the first data, and further comprising:

storing a single data instance of the first trip in the dynamic free-text search database such that the first keyword of the first relationship and the second keyword of the second relationship are linked in the dynamic free-text search database to the single data instance.

10. A system for implementing a dynamic free-text search database, the system comprising:

at least one processor; and
a memory coupled to the at least one processor, the memory storing instructions that upon execution by the at least one processor cause the system to:
  generate first data for the dynamic free-text search database that represents a first relationship including a first keyword, a first trip, and a first weight value;
  receive a plurality of free-text search requests;
  define a plurality of potential events that may occur with respect to a travel proposal returned in reply to the free-text search requests based on the first relationship;
  return one or more travel proposals for each of the free-text search requests based on the first relationship;
  record a number of occurrences of each potential event with respect to the one or more travel proposals returned for the free-text search requests;
  calculate a second weight value for the first relationship based on the number of occurrences, wherein the second weight value differs from the first weight value; and
  transform the first data into second data by inserting the second weight value into the first data such that the first relationship includes the second weight value.

11. The system of claim 10, further comprising:
at least one data storage device that hosts the dynamic free-text search database, wherein the instructions upon execution further cause the system to:
  establish a connection for data communication between the at least one data storage device and a travel proposal system that includes the at least one processor; and
  transmit the first data from the pricing system to the at least one data storage device via the connection.

12. The system of claim 10, wherein the first trip comprises a destination location, a point-of-sale, and one or more contextual parameters.

13. The system of claim 10, wherein the instructions causing the system to return the one or more travel proposals for each of the free-text search requests based on the first relationship comprises instructions that upon execution cause the system to:
for each free-text search request:
  apply a temporary adjustment to a plurality of event weights to define temporarily-adjusted event weights, wherein each event weight corresponds to one of the potential events, and
  return the one or more travel proposals for the free-text search request based on the temporarily-adjusted event weights.

14. The system of claim 13, wherein each potential event is associated with a plurality of counters, each counter is associated with a potential temporary adjustment, and the instructions causing the system to record the number of occurrences of each potential event with respect to the one or more travel proposals returned for the free-text search requests comprises instructions that upon execution cause the system to:

upon satisfaction of the potential event with respect to any one of the one or more travel proposals returned for the free-text search requests, increment a value of the counter associated with both the potential event and the potential temporary adjustment that matches the temporary adjustment on which return of the travel proposal satisfying the potential event was based.

15. The system of claim 14, wherein the instructions causing the system to compute the second weight value for the first relationship based on the number of occurrences comprises instructions that upon execution cause the system to:

for each potential event:
  compare the counters associated with the potential event, and
  alter the event weight corresponding to the potential event based on the potential temporary adjustment associated with the counter that is associated with the potential event having a highest value; and
compute the second weight value for the first relationship based on the altered event weight corresponding to each potential event.

16. The system of claim 10, wherein the instructions causing the system to generate the first data for the dynamic free-text search database comprises instructions that upon execution cause the system to:

determine an association from one or more online sources, wherein the association includes a free-text string linked to a third trip;
extract a third keyword from the free-text string; and
create the first data such that the first keyword and the first trip of the first relationship respectively correspond to the third keyword and the third trip.

17. The system of claim 10, wherein the dynamic free-text search database comprises additional data that represents a second relationship, the second relationship including a second trip, a third weight value, and the first keyword of the first relationship represented by the first data, and the instructions upon execution further causing the system to:

store a single data instance of the first keyword in the dynamic free-text search database such that the first trip of the first relationship and the second trip of the second relationship are linked in the dynamic free-text search database to the single data instance.

18. A computer program product, comprising:
a non-transitory computer readable medium; and
instructions stored on the non-transitory computer readable medium that upon execution by at least one processor cause the at least one processor to:
  generate first data for the dynamic free-text search database that represents a first relationship including a first keyword, a first trip, and a first weight value;

receive a plurality of free-text search requests;
define a plurality of potential events that may occur with respect to a travel proposal returned in reply to the free-text search requests based on the first relationship;
return one or more travel proposals for each of the free-text search requests based on the first relationship;
record a number of occurrences of each potential event with respect to the one or more travel proposals returned for the free-text search requests;
calculate a second weight value for the first relationship based on the number of occurrences, wherein the second weight value differs from the first weight value; and
transform the first data into second data by inserting the second weight value into the first data such that the first relationship includes the second weight value.

19. A method for implementing a dynamic free-text search database, the method comprising:
providing first data for the dynamic free-text search database that represents a first relationship including a first keyword, a first trip, and a first weight value, wherein
an association from one or more online sources is determined and the association includes a free-text string linked to a third trip,
a third keyword is extracted from the free-text string, and
the first data is created such that the first keyword and the first trip of the first relationship respectively correspond to the third keyword and the third trip;
receiving, by the at least one processor, a plurality of free-text search requests;
computing, by the at least one processor, a second weight value for the first relationship based on the free-text search requests, wherein the second weight value differs from the first weight value; and
transforming, by the at least one processor, the first data into second data by inserting the second weight value into the first data such that the first relationship includes the second weight value.

20. The method of claim 19, further comprising:
establishing a connection for data communication between at least one data storage device and a travel proposal system that includes the at least one processor, wherein the at least one data storage device hosts the dynamic free-text search database; and
transmitting the first data from the pricing system to the at least one data storage device via the connection.

21. The method of claim 19, wherein the first trip comprises a destination location, a point-of-sale, and one or more contextual parameters.

22. The method of claim 19, wherein the dynamic free-text search database comprises additional data that represents a second relationship, the second relationship including a second trip, a third weight value, and the first keyword of the first relationship represented by the first data, and further comprising:
storing a single data instance of the first keyword in the dynamic free-text search database such that the first trip of the first relationship and the second trip of the second relationship are linked in the dynamic free-text search database to the single data instance.

23. The method of claim 19, wherein the dynamic free-text search database comprises additional data that represents a second relationship, the second relationship including a second keyword, a third weight value, and the first trip of the first relationship represented by the first data, and further comprising:
storing a single data instance of the first trip in the dynamic free-text search database such that the first keyword of the first relationship and the second keyword of the second relationship are linked in the dynamic free-text search database to the single data instance.

24. A method for implementing a dynamic free-text search database, the method comprising:
providing first data for the dynamic free-text search database that represents a first relationship including a first keyword, a first trip, and a first weight value, wherein the dynamic free-text search database comprises additional data that represents a second relationship, the second relationship including a second trip, a third weight value, and the first keyword of the first relationship represented by the first data;
storing a single data instance of the first keyword in the dynamic free-text search database such that the first trip of the first relationship and the second trip of the second relationship are linked in the dynamic free-text search database to the single data instance;
receiving, by the at least one processor, a plurality of free-text search requests;
computing, by the at least one processor, a second weight value for the first relationship based on the free-text search requests, wherein the second weight value differs from the first weight value; and
transforming, by the at least one processor, the first data into second data by inserting the second weight value into the first data such that the first relationship includes the second weight value.

25. The method of claim 24, further comprising:
establishing a connection for data communication between at least one data storage device and a travel proposal system that includes the at least one processor, wherein the at least one data storage device hosts the dynamic free-text search database; and
transmitting the first data from the pricing system to the at least one data storage device via the connection.

26. The method of claim 24, wherein the first trip comprises a destination location, a point-of-sale, and one or more contextual parameters.

27. A method for implementing a dynamic free-text search database, the method comprising:
providing first data for the dynamic free-text search database that represents a first relationship including a first keyword, a first trip, and a first weight value, wherein the dynamic free-text search database comprises additional data that represents a second relationship, the second relationship including a second keyword, a third weight value, and the first trip of the first relationship represented by the first data;
storing a single data instance of the first trip in the dynamic free-text search database such that the first keyword of the first relationship and the second keyword of the second relationship are linked in the dynamic free-text search database to the single data instance;
receiving, by the at least one processor, a plurality of free-text search requests;
computing, by the at least one processor, a second weight value for the first relationship based on the free-text search requests, wherein the second weight value differs from the first weight value; and transforming, by the at least one processor, the first data into second data by inserting the second weight value into the first data such that the first relationship includes the second weight value.

28. The method of claim 27, further comprising:

establishing a connection for data communication between at least one data storage device and a travel proposal system that includes the at least one processor, wherein the at least one data storage device hosts the dynamic free-text search database; and transmitting the first data from the pricing system to the at least one data storage device via the connection.

29. The method of claim 27, wherein the first trip comprises a destination location, a point-of-sale, and one or more contextual parameters.

* * * * *